(12) United States Patent
Iellimo et al.

(10) Patent No.: US 12,258,211 B2
(45) Date of Patent: Mar. 25, 2025

(54) PALLET CART SAFETY STRUCTURE AND METHOD

(71) Applicant: FRAZIER INDUSTRIAL COMPANY, Long Valley, NJ (US)

(72) Inventors: Domenick Iellimo, Forked River, NJ (US); Emery Louis (Jim) Kocsis, Fort Worth, TX (US)

(73) Assignee: Frazier Industrial Company, Long Valley, NJ (US)

( * ) Notice: Subject to any disclaimer, the term of this patent is extended or adjusted under 35 U.S.C. 154(b) by 347 days.

(21) Appl. No.: 17/881,764

(22) Filed: Aug. 5, 2022

(65) Prior Publication Data

US 2024/0043210 A1     Feb. 8, 2024

(51) Int. Cl.
*B65G 1/10*     (2006.01)
*B65G 1/06*     (2006.01)

(52) U.S. Cl.
CPC ............. *B65G 1/10* (2013.01); *B65G 1/06* (2013.01); *B65G 2201/0267* (2013.01)

(58) Field of Classification Search
CPC ........ B65G 1/023; B65G 1/026; B65G 1/065; B65G 1/10; B65G 1/06; B65G 1/0492; B65G 1/0414; B65G 2201/0267
See application file for complete search history.

(56) References Cited

U.S. PATENT DOCUMENTS

| | | | | |
|---|---|---|---|---|
| 3,800,963 A * | 4/1974 | Holland | ................. | B65G 1/065 414/281 |
| 4,955,489 A * | 9/1990 | Allen | ..................... | B65G 1/026 211/151 |
| 5,316,157 A * | 5/1994 | Konstant | ................. | A47B 53/00 211/151 |
| 5,348,169 A * | 9/1994 | Allen | ....................... | B65G 1/06 211/151 |
| 5,595,311 A * | 1/1997 | Allen | ..................... | B65G 1/026 211/151 |
| 5,848,713 A * | 12/1998 | Allen | ....................... | B65G 1/02 211/151 |
| 6,041,719 A * | 3/2000 | Vidal | ................. | B65D 19/0002 108/56.3 |
| 6,648,573 B1 * | 11/2003 | Davison | ................. | B65G 1/026 211/151 |
| 7,810,656 B2 * | 10/2010 | Lewis | ..................... | B65G 1/06 211/151 |
| 9,150,231 B2 * | 10/2015 | De Jong | ................. | B62B 3/002 |

(Continued)

*Primary Examiner* — Patrick D Hawn
(74) *Attorney, Agent, or Firm* — Dilworth & Barrese, LLP (57) ABSTRACT

A structure and method for safely loading and unloading pallet carts to and from multi-level commercial storage racks includes a security structure to catch the carts, in case they fall during the loading or unloading procedure. A pair of rail structures typically extends from the front to the rear of a storage bay. Pallet transportation carts travel on a lower surface of these rail structures and the pallets rest on an upper surface of the rails. A cart security structure in the form of a grate is positioned under the rails, at least at the front of the storage bay. The cart security structure should be about as wide as the space between the rails and should be sufficiently below the rails, so as not to interfere with cart movement. The structure should be constructed to prevent the accumulation of items that can interfere with pallet loading.

20 Claims, 8 Drawing Sheets

(56) References Cited

U.S. PATENT DOCUMENTS

| | | | |
|---|---|---|---|
| 9,359,135 B2* | 6/2016 | Nagamine | H01L 21/67769 |
| 9,499,339 B2* | 11/2016 | Roberto | B65G 1/0492 |
| 10,351,344 B2* | 7/2019 | Gebhardt | B65G 1/0492 |
| 10,952,533 B2* | 3/2021 | Lert, Jr. | B65G 1/065 |
| 11,084,622 B2* | 8/2021 | Brumm | B65D 19/0004 |
| 11,845,609 B2* | 12/2023 | Iellimo | B65G 1/0492 |
| 2009/0308289 A1* | 12/2009 | Ferguson | B31D 5/0086 29/428 |
| 2013/0129454 A1* | 5/2013 | Salichs | B65G 1/0492 414/277 |
| 2016/0251159 A1* | 9/2016 | Brumm | B65G 1/02 29/525 |
| 2022/0017305 A1* | 1/2022 | Larsson | B65G 1/0492 |
| 2023/0202769 A1* | 6/2023 | Branner | B65G 47/22 414/816 |
| 2023/0257200 A1* | 8/2023 | Iellimo | B65G 1/1376 700/218 |
| 2024/0208737 A1* | 6/2024 | Li | B65G 1/08 |
| 2024/0294332 A1* | 9/2024 | Austrheim | B65G 1/065 |

* cited by examiner

PALLET CART SAFETY STRUCTURE AND METHOD

BACKGROUND OF THE INVENTION

The invention relates generally to a structure and method for preventing the automated pallet carts used for arranging pallets of goods on a commercial warehouse storage rack from falling off the rack when being loaded thereon or unloaded therefrom, e.g., by a forklift.

Storage rack systems are used in warehouses, retail stores, cold storage areas and other storage facilities to store pallets of goods. Certain storage systems employ extensive multi-story storage rack systems, often called deep lane high-density storage systems, to store large quantities of a variety of different products. These products are typically constrained onto pallets by various means, such as stretch or shrink wrapping. These rack systems often employ four, five or more vertically aligned levels of storage rack bays, each of which can be many pallets deep. Some systems can be 10, 20, 30 or more pallets deep. Due to the density of the storage area and the limited sight lines, it can be time consuming and present logistical problems to load or retrieve the pallets from these high-density storage rack rows.

Rack systems are typically formed with vertical columns, which support horizontal rails running lengthwise from the front of a storage bay row to the rear of each bay. The horizontal rails can have an upper surface for supporting pallets of goods and a lower surface for supporting the wheels of robotically automated carts for moving the pallets of goods into and out of the storage bay, hereinafter, pallet carts.

It has become common to use automated or semi-automated robotic pallet carts to load and unload the pallets from these racks. These pallet carts can have internal drive systems to move along rails that are positioned under the racks of goods. Many of these carts include a lift system on their upper surface. After the cart is positioned under a pallet, a pallet lifting platform lifts the pallet off the rail, and the cart brings the pallet to the desired location, where it can be lowered into place and/or removed with a forklift. Thus, it is important for the carts to move unobstructed and for the pallets to be easily loaded onto a rack and moved along a row, without obstruction.

It is becoming common for these storage racks to be 3, 5, 7, or more rows high. The pallet carts are expensive and it has become common shuttle the pallet carts among different storage bay rows onto the specific row as needed, as it is costly to dedicate an individual pallet cart to a specific row. Loading the pallet cart onto the cart rails, between the pallet support rails, can be difficult. If not loaded properly, the pallet cart can fall between the rails. These carts can weigh over 400 lbs. This can become a very dangerous and costly incident. To date, no system has been fully adequate for addressing this issue without interfering with pallet movement.

These and other shortcomings in storage rack construction and pallet cart safety methods have persisted for many years without a satisfactory solution. Accordingly, it is desirable to provide a system and method to help prevent pallet carts from falling from storage racks. Accordingly, a more satisfactory structure, system and method are needed to overcome drawbacks and deficiencies in the prior art.

SUMMARY

Generally speaking, in accordance with the invention, a structure and method for safely loading and unloading pallet carts from storage racks is provided. In one embodiment of the invention, a pair of rails runs from the front of a storage bay to the rear. The pallet transportation carts travel on a lower surface of these rails and the pallets rest on an upper surface of the rails. Separate pallet and cart rails can be used. A cart security structure is positioned under the rails, at least at the front of the storage bay. The cart security structure should extend at least 3 feet into the bay, preferably at least 40 inches, most preferably at least 50 inches. The cart security structure should have a width about as wide as the distance between the two rails. In embodiments of the invention, it should be at least 30 inches wide, preferably at least 33 inches wide.

The security structure can be directly or indirectly attached to the rails or otherwise supported. In one embodiment of the invention, the rails are supported by vertical columns and the security structure is directly or indirectly connected to the columns. For example, horizontal beams can connect columns. The beams can be positioned perpendicular to the rails. The security structure can be connected to the horizontal beams. Clips such as angle bracket shaped clips can be used. These can have a bolt receiving hole formed therethrough and the clips can be bolted to the security structure and the beams.

The security structure should be mostly open, so as not to collect any chips of wood or other materials that come off the pallets as they are loaded and unloaded onto the storage rack. If these wood chips or other items collect on the cart security structure, they can interfere with the loading and unloading of pallets. Thus, it is preferred that the cart security structure be mostly open, to permit these items to fall through openings in the structure.

In one embodiment of the invention, the structure comprises horizontal beams, extending between the pair of rails, none of which are wider than about 3 inches. Preferably, the beams should be 2 inches wide or less. The cart security structure can have a cross-member grate structure, formed as a lattice of strips. The holes between the strips should be larger than 2 inches across, preferably larger than 3 inches across.

In preferred embodiments of the invention, a storage rack system can comprise vertical columns having horizontal beams extending between the vertical columns and perpendicular to the rearward direction. These horizontal beams can be in the shape of an angle bracket, with an L-shaped cross section. Thus, the horizontal beams have a horizontal wall with a horizontal plane, and a vertical wall, with a vertical plane. For example, a first front face beam can be located at the front of a storage bay, followed by a first internal beam, a second internal beam, and so forth, into the rearward depth of the storage bay.

Cart security structures in accordance with the invention can be attached to the horizontal beams. For example, a front end of a security structure can be mounted to the vertical wall of the front face beam, and a rear end of the security structure can be mounted to the vertical wall of the first internal beam. The security structure can rest on the horizontal wall of the horizontal beams. In preferred embodiments of the invention, angle bracket-shaped clips with L-shaped cross sections can bolted to the front and rear ends of the security structure and these clips can be bolted to the vertical walls of the horizontal beams.

In preferred embodiments of the invention, the security structure comprises a pair of longitudinal support members, extending lengthwise from the front to the rear direction. An assembly of horizontal cross beams extend sideways, between the longitudinal support members. In preferred embodiments of the invention, the longitudinal support members can be angle bracket shaped, with an L-shaped cross section. The support members will have a vertical wall and a horizontal wall. The cross beams can rest on the horizontal wall. In a preferred embodiment of the invention, they are welded to the support members.

In preferred embodiments of the invention, the horizontal crossbeams should not have a horizontal surface, on which chunks of debris or other items can collect. For example, the top of the crossbeams can be convex, either domed or inclined, such as with an upper apex. The angle at the apex can be wide, up to about 150°, preferably up to 120°, preferably about 90°. The horizontal crossbeams can be L-shaped angle bracket shaped, mounted to the support members, with the vertex of the angle bracket pointing upwards, presenting two declining surfaces at approximately a 90° angle.

The support members, crossbeams, and mounting clips can have a thickness of at least about 1/10 inch, preferably at least about 1/8 inch. In preferred embodiments of the invention, the support members, clips, and crossbeams can be at least about 12 gauge steel, preferably about 8-12 gauge steel, more preferably about 10 gauge. The support members, crossbeams, and mounting clips can have thicknesses of at least 0.1 inches, preferably ranging from about 0.1 inches to about 0.18 inches, preferably about 0.13 inches.

Other objects, advantages and embodiments of the invention will be apparent from the specification and the drawings and the scope of the invention will be indicated in the claims.

BRIEF DESCRIPTION OF THE DRAWINGS

For a fuller understanding of the invention, reference is had to the following description, taken in connection with the accompanying drawings, in which.

The figures are for illustration only and should not be interpreted as limiting. Similar parts are assigned the same reference numerals. The proportions of the parts are illustrative and the invention can be practiced outside the scale of the drawings, which are not necessarily to scale.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
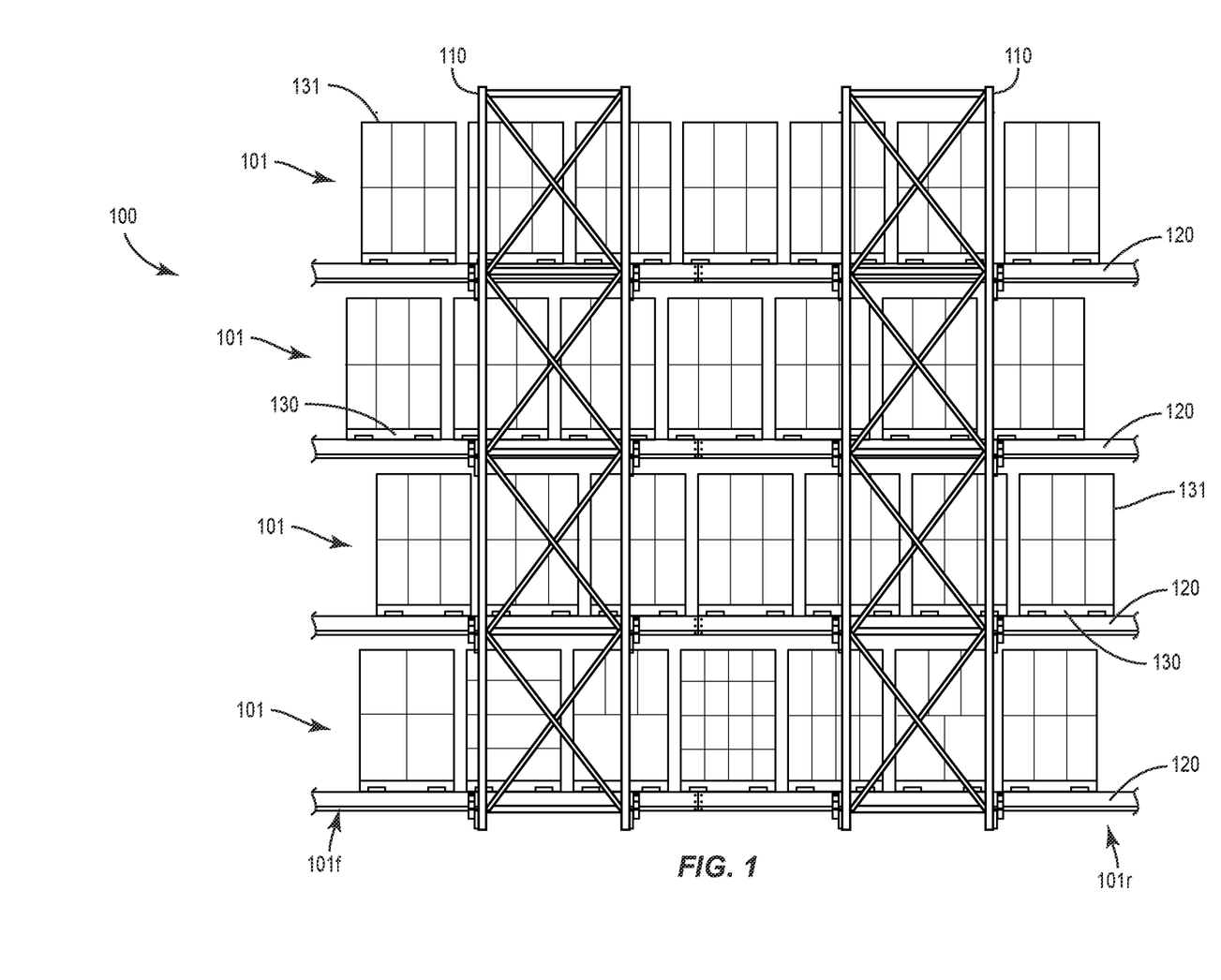
FIG. 1 is a side view of a commercial warehouse storage rack in accordance with a preferred embodiment of the invention.
Figure 2:
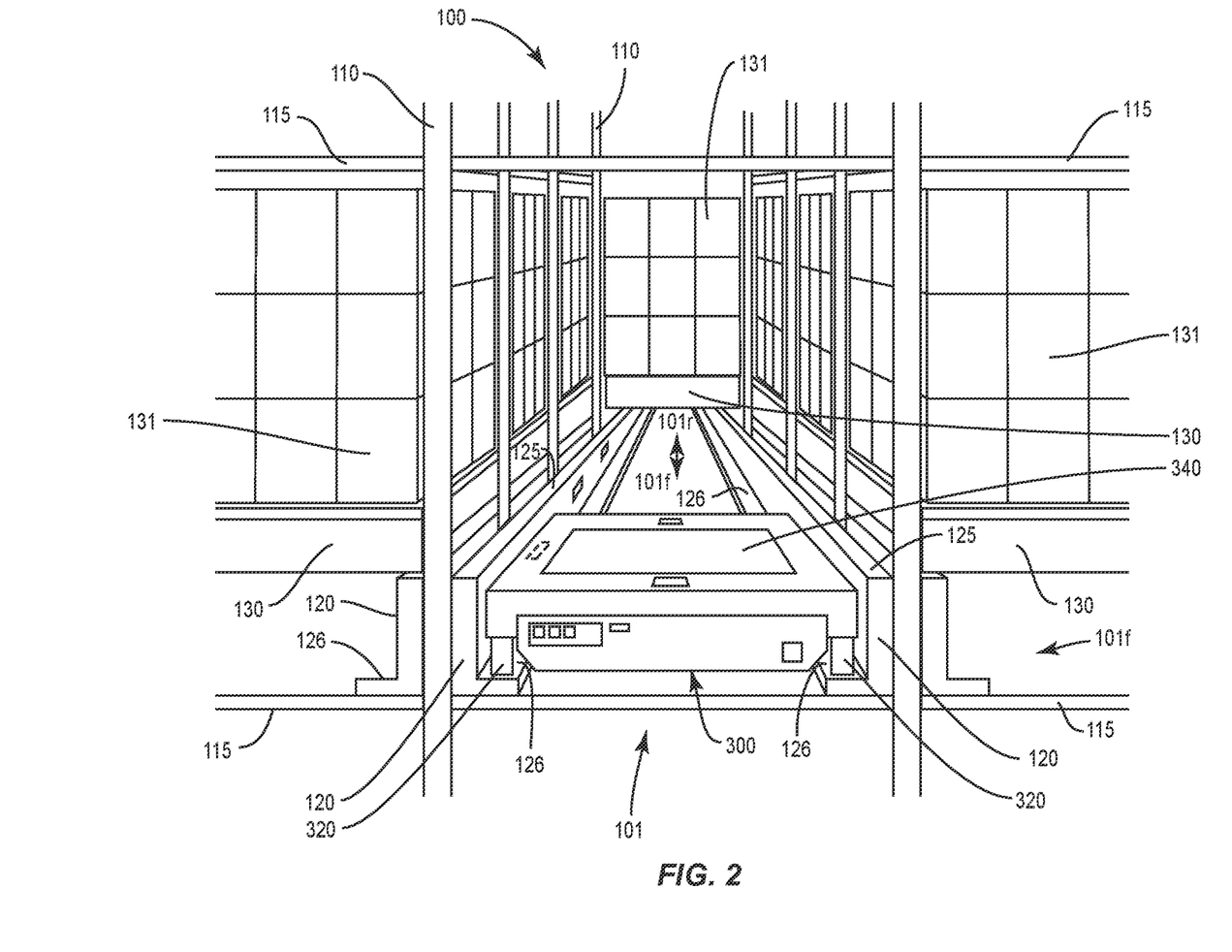
FIG. 2 is a front end view of a lane of the storage rack of FIG. 1.

A multi-level, multi-column rack storage system with no aisles between many of the columns of storage rows of is shown generally in FIGS. 1 and 2 as a storage rack 100. Storage rack 100 includes an array of vertical support columns 110, which support horizontal beams 115, to provide structural support. Storage rack 100 includes a matrix of storage bays 101, extending from a storage bay front 101*f* where a pallet 130 of goods 131 is loaded and unloaded, to a storage bay rear 101*r*. In some embodiments of the invention, bay 101 has two "fronts 101*f*" so that pallets 130 of goods 131 can be loaded and unloaded from both ends of bay 101.

Figure 3:
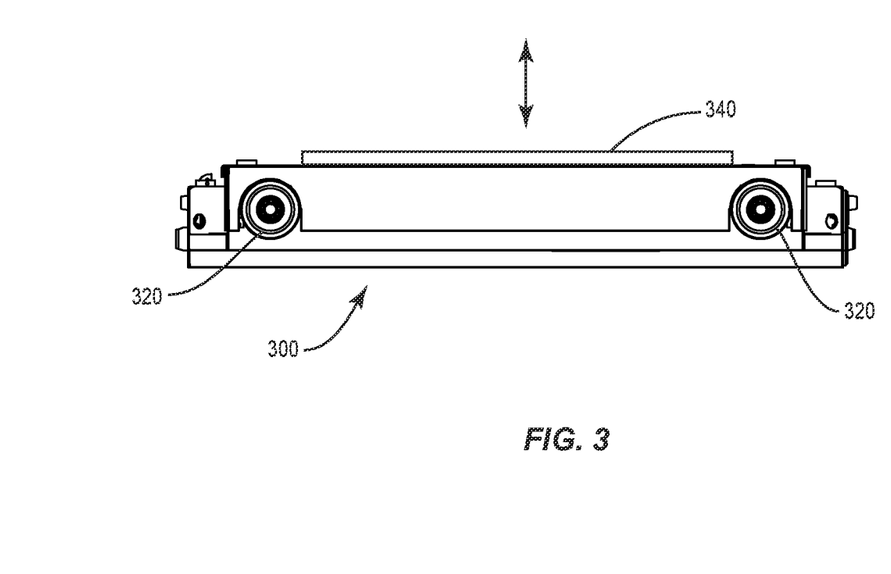
FIG. 3 is a side view of a pallet transportation cart, in accordance with an embodiment of the invention.

As indicated, rack 100 supports a plurality of pallets 130 that are loaded with an assortment of goods 131 in a matrix of storage bays 101. An automated pallet transportation cart 300, shown in FIGS. 2 and 3, is provided to transport pallets 130 of goods 131 to a location in bay 101 between bay front 101*f* and bay rear 101*r*. Pallet cart 300 can be loaded and unloaded into and out of storage bay 101 from one or both ends of bay 101, depending on particular circumstances and construction specifications and space allotments.

Each bay 101 includes a pair of parallel support rails 120. Support rails 120 extend in a rearward direction from storage bay front 101*f* to storage bay rear 101*r*. Support rails 120 include a pallet support surface 125, on which a plurality of pallets 130, with a variety of goods 131 can be supported thereon, with rails 120 underneath.

Each pair of rails 120 also includes a cart support surface 126 at a level below pallet support surface 125. Each cart 300 includes four wheels 320 for riding on cart support surface 126 of rails 120 of storage bay 101. Cart 300 also includes a raiseable lifting platform 340 (sometimes called a deck or deck lid) for raising pallets 130 off pallet support surface 125 and carrying pallets 130 to the desired location in bay 101, then lowering them onto support surface 125 of rails 120. Pallets 130 can weigh well under or up to 1000 lb., 2000 lb., even up to 3000 lbs. or more when loaded with goods 131. Typically, the combined weight of pallets in a storage bay lane will exceed 4000 lbs. and can exceed many times that weight. However, under certain circumstances, the weight will be far less. Carts 300 can weigh over 400 lb, even over 650 lb.

Figure 4:
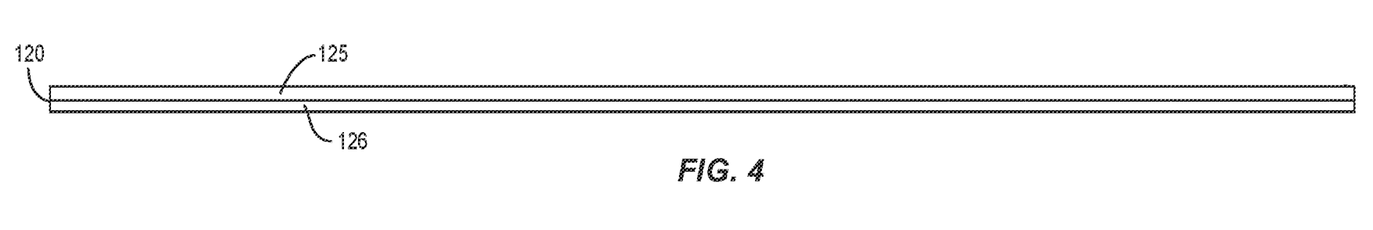
FIG. 4 is a top view of a rail for a lane of the storage rack of FIG. 1.
Figure 5:
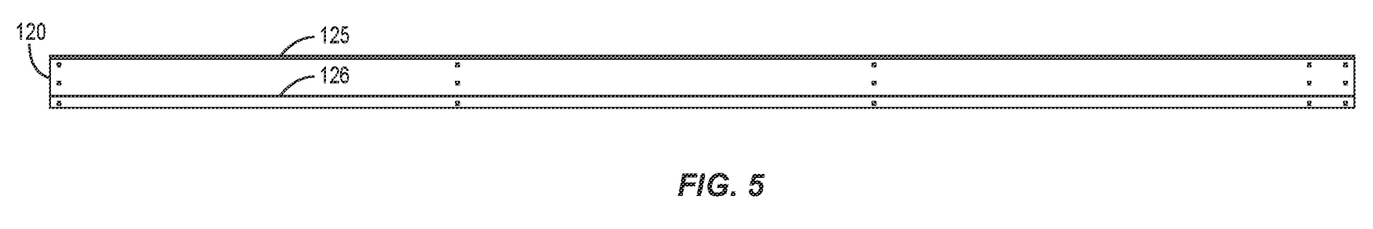
FIG. 5 is a side view of a rail for a lane of the storage rack of FIG. 1.
Figure 6:
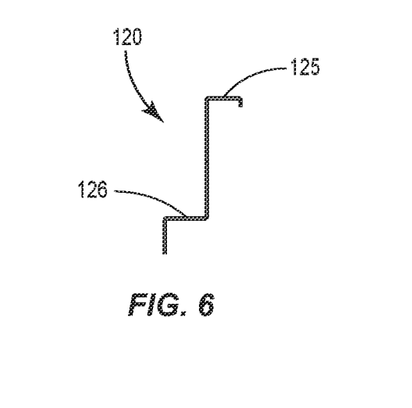
FIG. 6 is an end view of a rail for a lane of the storage rack of FIG. 1.
Figure 7:
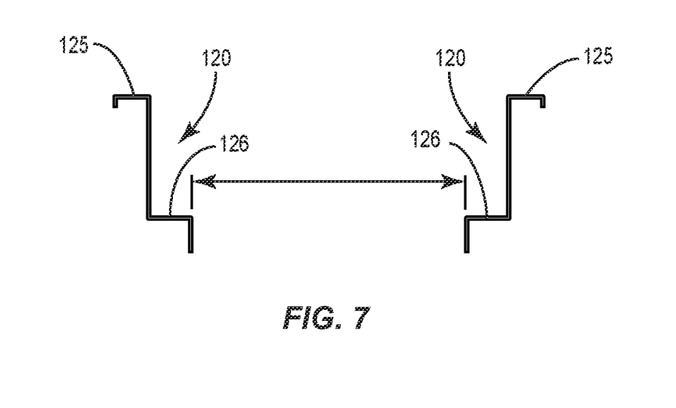
FIG. 7 is an end view of a pair of rails for a lane of the storage rack of FIG. 1.

A top view of a single rail 120 of a storage bay 101 is shown in FIG. 4; a side view of rail 120 is shown in FIG. 5; and an end view is shown in FIG. 6. A pair of rails 120 is shown in FIG. 7. As indicated above, pallets 130 of goods 131 rest on pallet support surface 125 and wheels 320 of carts 300 ride on cart support surface 126.

Carts 300 can be costly. It is therefore common to shuffle a single cart among several lanes 101. Carts 300 are typically moved about rack 100 with a fork lift. Often, a storage bay is more than 8 feet high off the floor/ground. They can even be over 20 feet off the floor. It can be difficult to properly position cart 300 on rails 120, with wheels 320 properly located on cart support surface 126.

Figure 8:
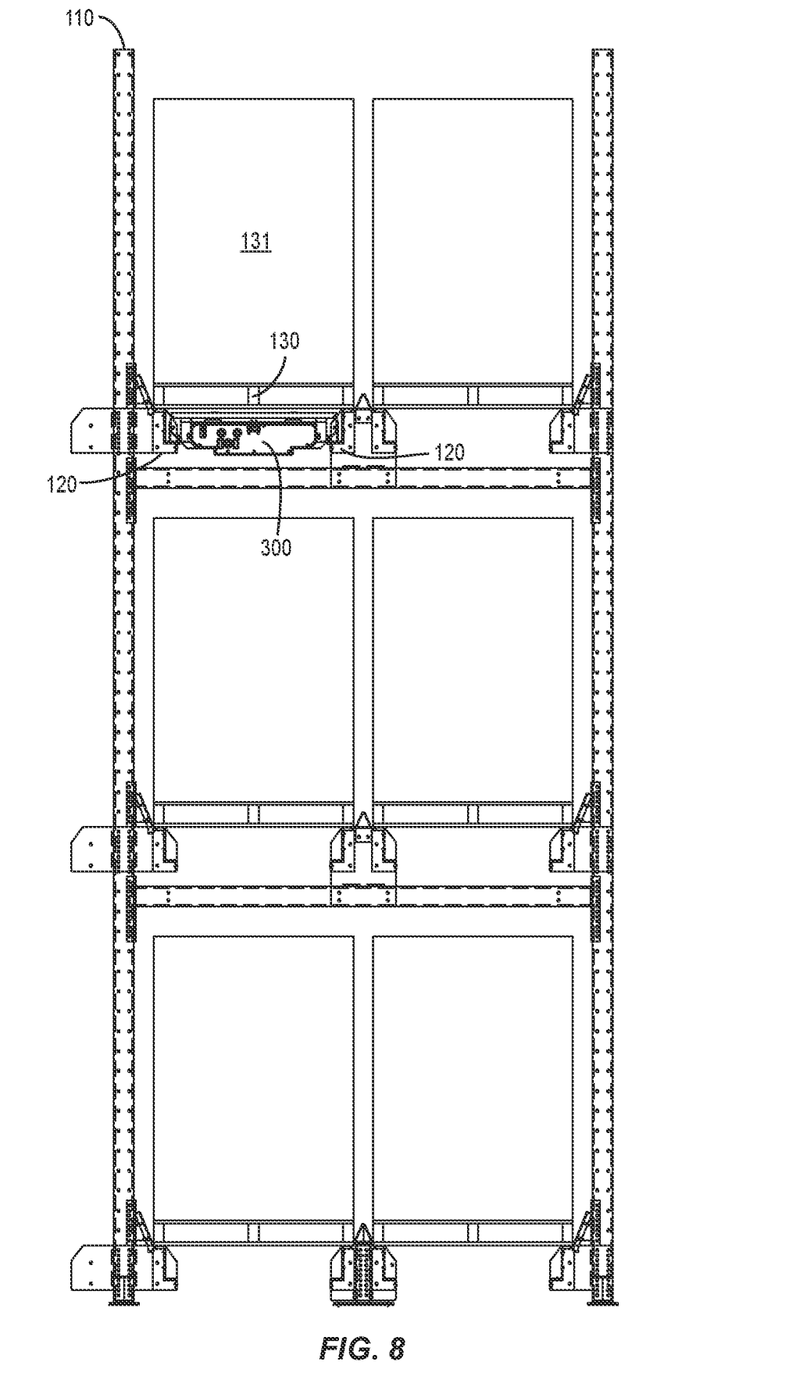
FIG. 8 is an end view of the rack of FIG. 1.
Figure 9:
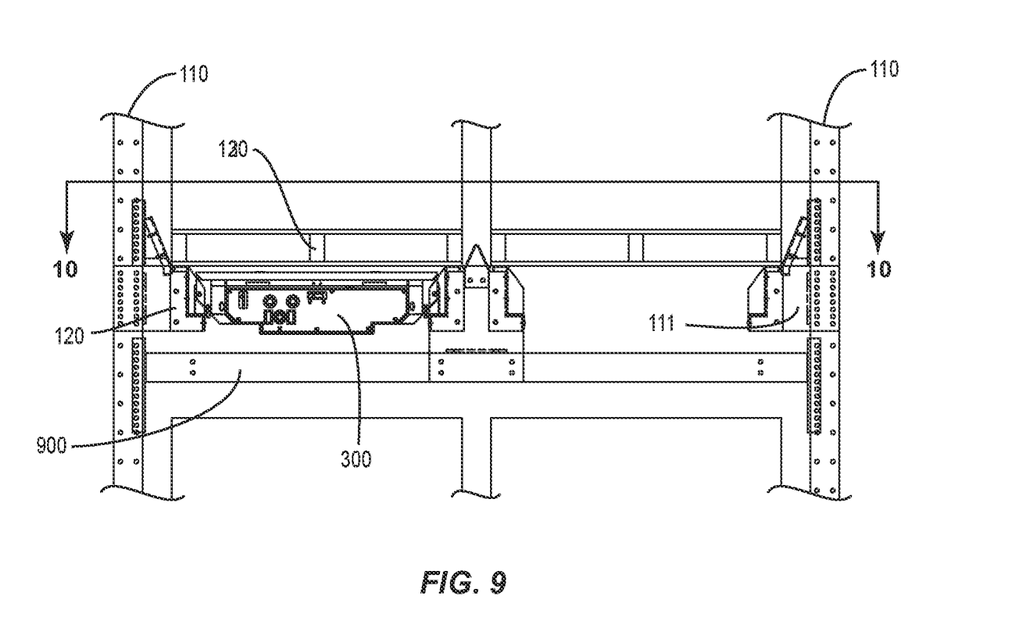
FIG. 9 is an enlarged partial end view of the rack of FIG. 1.
Figure 10:
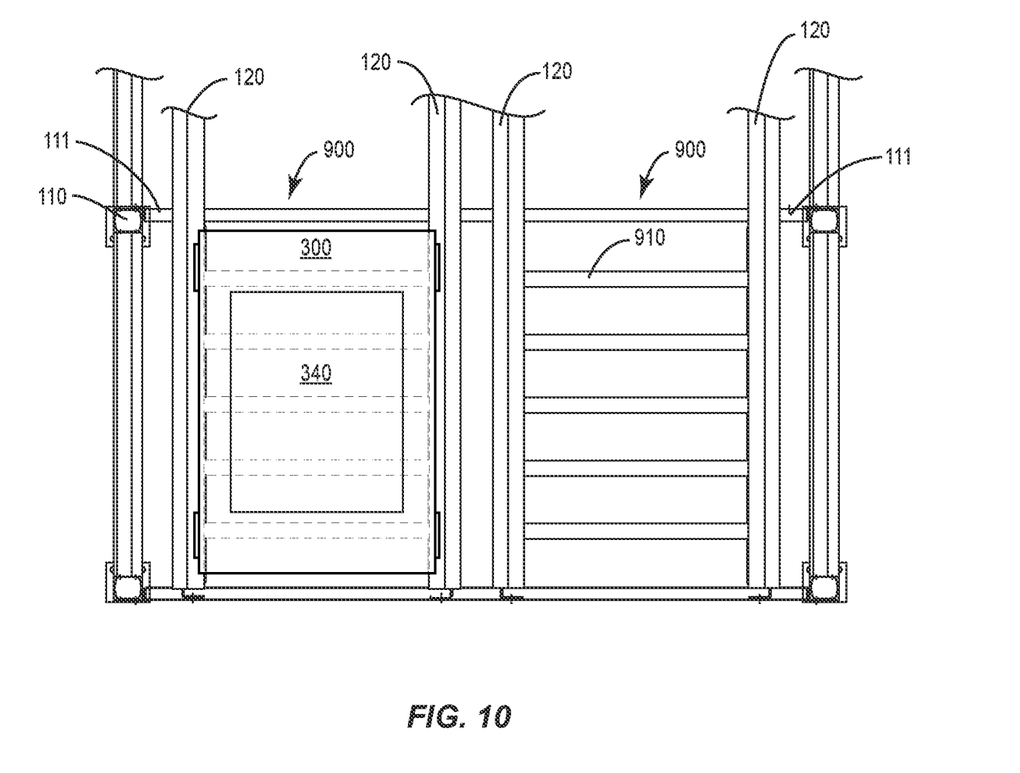
FIG. 10 is an enlarged partial top view of the rack of FIG. 1, showing a pallet transportation cart positioned over a cart security structure in accordance with an embodiment of the invention.

Referring now to FIGS. 9 and 10, a cart security structure 900 is provided for catching pallet transportation carts 300 that inadvertently fall between rails 120. Rails 120 are typically positioned should be about 25-35 inches apart, typically about 30-32 inches apart. As shown in FIGS. 8 and 9, rails 120 can be secured to vertical columns 110 with a suitable support member 111.

In a preferred embodiment of the invention, security structure 900 is formed of a plurality of horizontal cross beams 910. Preferably, there should be at least 3 cross beams 910, more preferably at least 4 cross beams 910, even more preferably four to six beams 910. In one particularly preferred embodiment of the invention, security structure 900 is formed with five cross beams 910. As noted above, it is important that security structure 900 be formed with mostly open space, so that chunks of wood and other items that inadvertently come off the pallets will not collect thereon. Therefore, cross beams 910 should be no more than about 2-5 inches wide in plan view from the front to rear direction, preferably about 2-3 inches wide. The space between beams 910 should be more than about 5 inches wide, preferably more than about 7 inches wide. In some embodiments of the invention, it is possible to include cross structures that are perpendicular to or at an angle to beams 910, so long as a place where items can collect is not created.

Security structure 900 should not have any large open spaces over at least the first inches into bay 101 that are larger than a dimension of cart 300, so that cart 300 cannot fall therethrough. Some carts can have a height as short as 8 inches. Therefore, in one embodiment of the invention, if beams 910 are horizontal, they should be less than 7 inches apart, to prevent a cart 300 from falling therethrough. In preferred embodiments of the invention, the open spaces should not have a dimension over 10 inches, preferably not over 7 inches wide. Security structure 900 should be at least two, preferably at least 5 inches below the rails 120.

In operation, a cart 300 can be loaded into a top (or other) bay 101, such that wheels 320 of cart 300 rest on respective cart support surfaces 126 of rails 120. If an error occurs, and cart 300 falls between rails 120, it will be caught by security structure 900 and calamities can be prevented. Therefore, security structure should be able to support at least 500 pounds, preferably over 1000 pounds.

By way of example, rails 120 can be made from steel of at least 16 gauge, preferably 16 to 7 gauge, or thicker. Steel at least 1/16 thick, preferably 1/16 to 3/16 inch thick is preferred. Beams 910 of structure 900 should be made from steel of at least 12 gauge, preferably about 12-8 gauge, or thicker. Steel at least 0.1 inch thick, preferably 0.1 to 0.16 inch thick is preferred.

Figure 11:
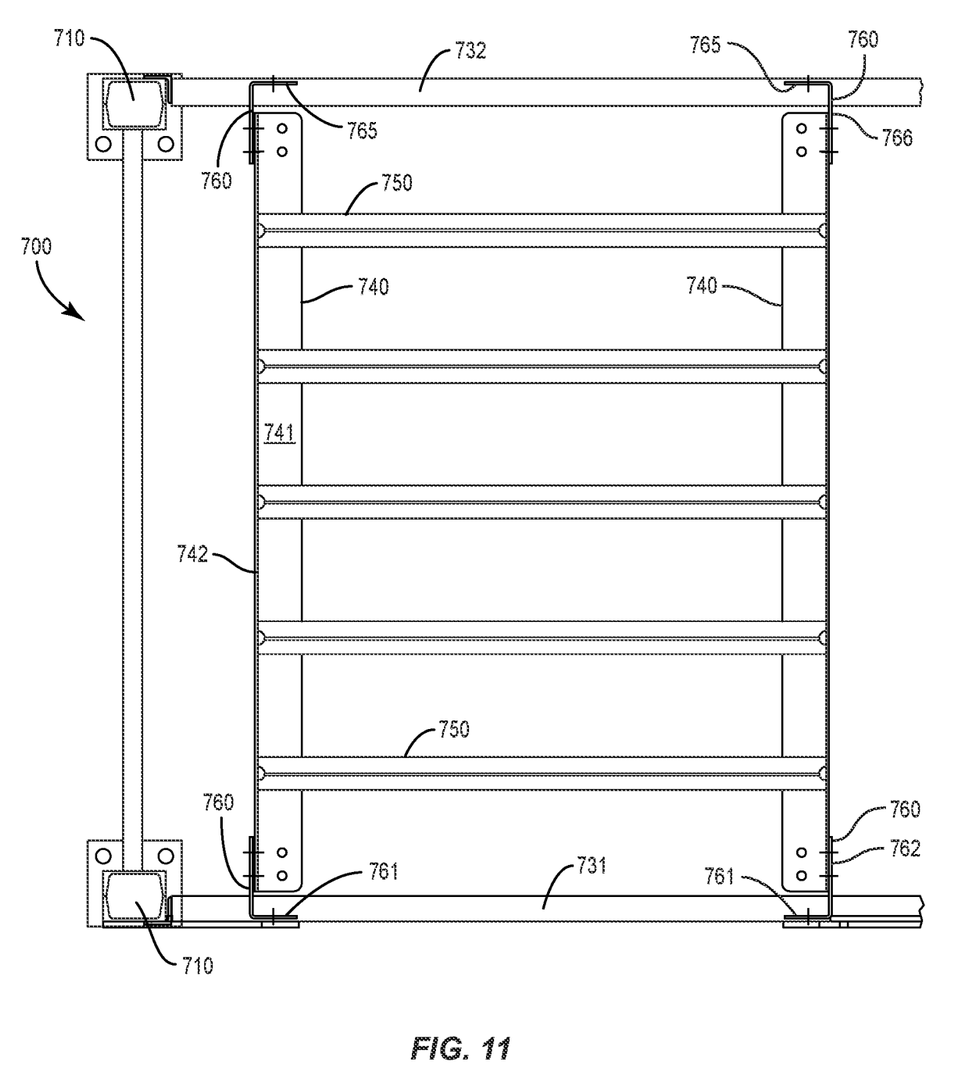
FIG. 11 is a top plan view of a pallet cart security structure in accordance with a preferred embodiment of the invention.
Figure 12:
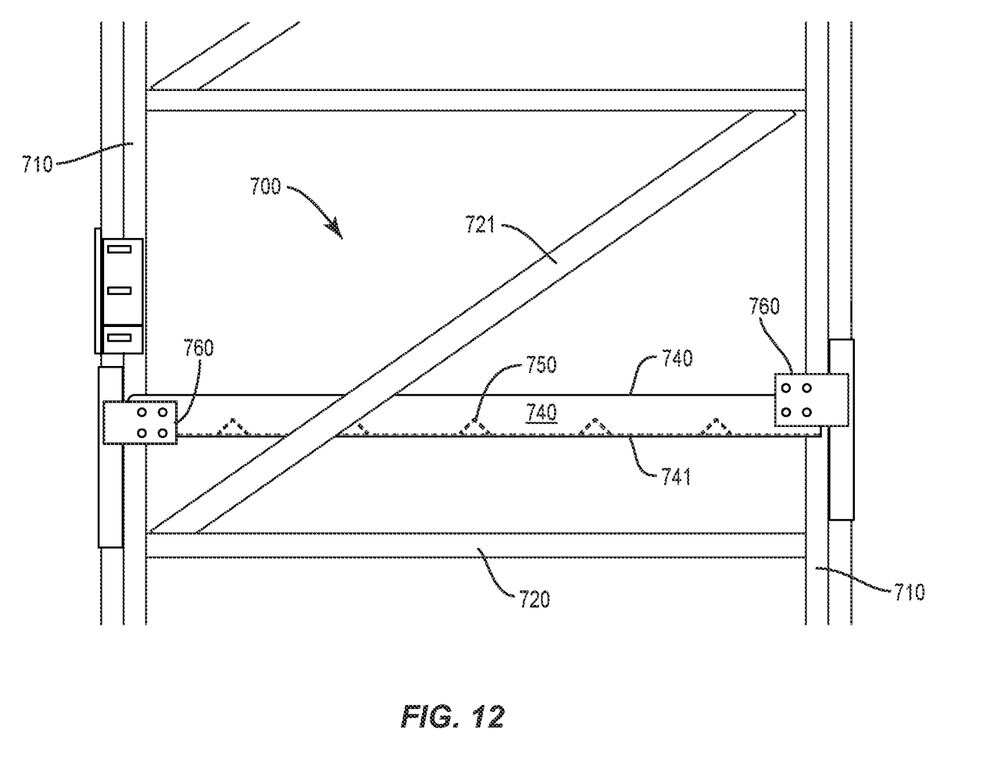
FIG. 12 is a side view of the structure of FIG. 11.

A safety structure 700 in accordance with a preferred embodiment of the invention is shown generally in FIGS. 11 and 12. As discussed above, storage rack systems in accordance with the invention employ a plurality of vertical columns 710 that rise from a warehouse floor (not shown). A plurality of lengthwise support members 720 and diagonal support members 721 extend from the front to the rear of the storage rack and can be used to connect and help stabilize vertical columns 710. A plurality of horizontal support members extend sideways from support columns 710, including a front face cross beam 731, a first internal cross beam 732, and so on. Cross beams 731 and 732 can be L-shaped angle bracket in shape, having a horizontal wall with a horizontal plane and a vertical wall, with a vertical plane.

Security structure 700 includes a pair of lengthwise support members 740 and an assembly of cross beams 750 thereon. Support member 740 is in the form of an L-shaped angle bracket, having a horizontal surface 741 and a vertical wall 742. Cross beams 750 are convex, so as not to provide a flat surface, where chunks of wood that might be chipped off of pallets can accumulate. Thus, cross beams 750 are formed as an angle bracket with an L-shaped cross section. The vertex of cross beams 750 points up, and the ends of the two arms rest on horizontal surface 741 of support member 740. In preferred embodiments of the invention, cross beams 750 are welded to support members 740. A front end of security structure 740 is attached to front face beam 731 and a rear end of security structure 700 is attached to first internal beams 732 with a plurality of attachment clips 760.

Attachment clips 760 have the form of an L-shaped angle bracket. A front facing surface of a front facing arm 761 of front attachment clip 760 is bolted to the vertical wall of front face beam 731. A rear facing surface of a rear facing arm 765 of rear attachment clip 760 is bolted to the vertical wall of first internal beam 732. A side facing surface of a side facing arm 762 of front attachment clip 760 is bolted to the vertical wall 742 of support member 740. A side facing surface of a side facing arm 766 of rear attachment clip 765 is bolted to vertical wall 742 of support member 740. Thus, security structure 700 is bolted to horizontal beams 731 and 732 with clips 760.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A commercial storage rack adapted to support multiple pallets of goods weighing at least four thousand pounds combined, comprising:

a first pallet storage bay having a front end at a front of the storage rack and a rear end at a rear of the storage rack, and a first pair of left and right parallel rail structures extending in a rearward direction from the front of the first bay to the rear of the first bay, the rail structures having an upper pallet support surface adapted to support the pallets and a lower cart support surface below the upper pallet support surface, adapted to support an assemblage of wheels of an automated pallet transportation cart adapted to transport and deposit the pallets of goods onto the upper pallet support surface;
a front and a rear cross member extending from the left side to the right side of the bay under the first left and right parallel rails;
a security structure positioned between the front and rear cross members, the security structure comprising a left side and a right side security support member extending in a rearward direction from a front end of the security structure to a rear end of the security structure, the security structure comprising an assembly of cross beams extending from the left side to the right side security support members under the first pair of parallel rails, the security structure located from the front of the bay in a rearward direction towards the rear of the bay, the security structure adapted to support at least 500 pounds.

2. The storage rack of claim 1, wherein the security structure extends rearwards at least 3 feet from the front of the bay.

3. The storage rack of claim 1, wherein the security structure extends rearwards at least 50 inches from the front of the bay.

4. The storage rack of claim 1, wherein the storage rack includes a plurality of vertical columns extending up from a floor on the left and right sides of the bay, the front and rear cross members are supported by the vertical columns, and the security structure is attached to the cross members.

5. The storage rack of claim 1, wherein the security support members have an L-shaped cross section, with a horizontal surface and a vertical surface.

6. The storage rack of claim 1, wherein the cross beams have a L-shaped cross section.

7. The storage rack of claim 1, wherein the cross beams have a convex upper surface.

8. The storage rack of claim 1, wherein at least one of the cross beams has an L-shape cross section, with two arms extending at a downwards incline from a vertex at an apex thereof.

9. The storage rack of claim 1, wherein none of the cross beams have a flat horizontal surface.

10. The storage rack of claim 1, wherein there are 3 to 8 cross beams.

11. The storage rack of claim 1, wherein there are 5 cross beams.

12. The storage rack of claim 1, wherein the cross beams are welded to the horizontal surface of the security support members.

13. The storage rack of claim 1, wherein the security support members and the cross beams are at least 0.1 inches thick.

14. The storage rack of claim 1, wherein the support members and the cross beams are formed from 12 to 8 gauge steel.

15. The storage rack of claim 1, wherein the security structure is at least 2 inches below the rails.

16. The storage rack of claim 1, wherein the security structure is at least 5 inches below the rails.

17. A commercial storage rack, comprising:
a pallet storage bay having a front end at a front of the storage rack and a rear end at a rear of the storage rack;
a pair of parallel rail structures extending in a rearward direction from the front of the storage bay to the rear of the storage bay, the rail structures having an upper pallet support surface adapted to support a plurality of pallets of goods and a lower cart support surface below the upper pallet support surface, adapted to support an assemblage of wheels of an automated pallet transportation cart adapted to transport and deposit the pallets of goods onto the upper pallet support surface;
a security structure comprising an assembly of cross beams having a convex top surface under the pair of parallel rails, the security structure located from the front of the storage bay in a rearward direction towards the rear of the storage bay, the security structure adapted to support at least 500 pounds.

18. The commercial storage rack of claim 17, wherein the security structure comprises a pair of parallel left and right security support members with an L-shaped cross section extending from the front to the rear of the bay and the cross beams extend between the security support members.

19. The commercial storage rack of claim 17, wherein the storage rack comprises a plurality of vertical column on the left and right sides of the bay, a front and a rear cross member couple respective left and right columns, and the security structure is mounted to and between the front and rear cross members.

20. The commercial storage rack of claim 17, wherein the cross members have an L-shaped cross section.

* * * * *